Sept. 5, 1967  J. W. TEEGARDEN  3,339,577
VALVE CONSTRUCTION
Filed Oct. 1, 1965
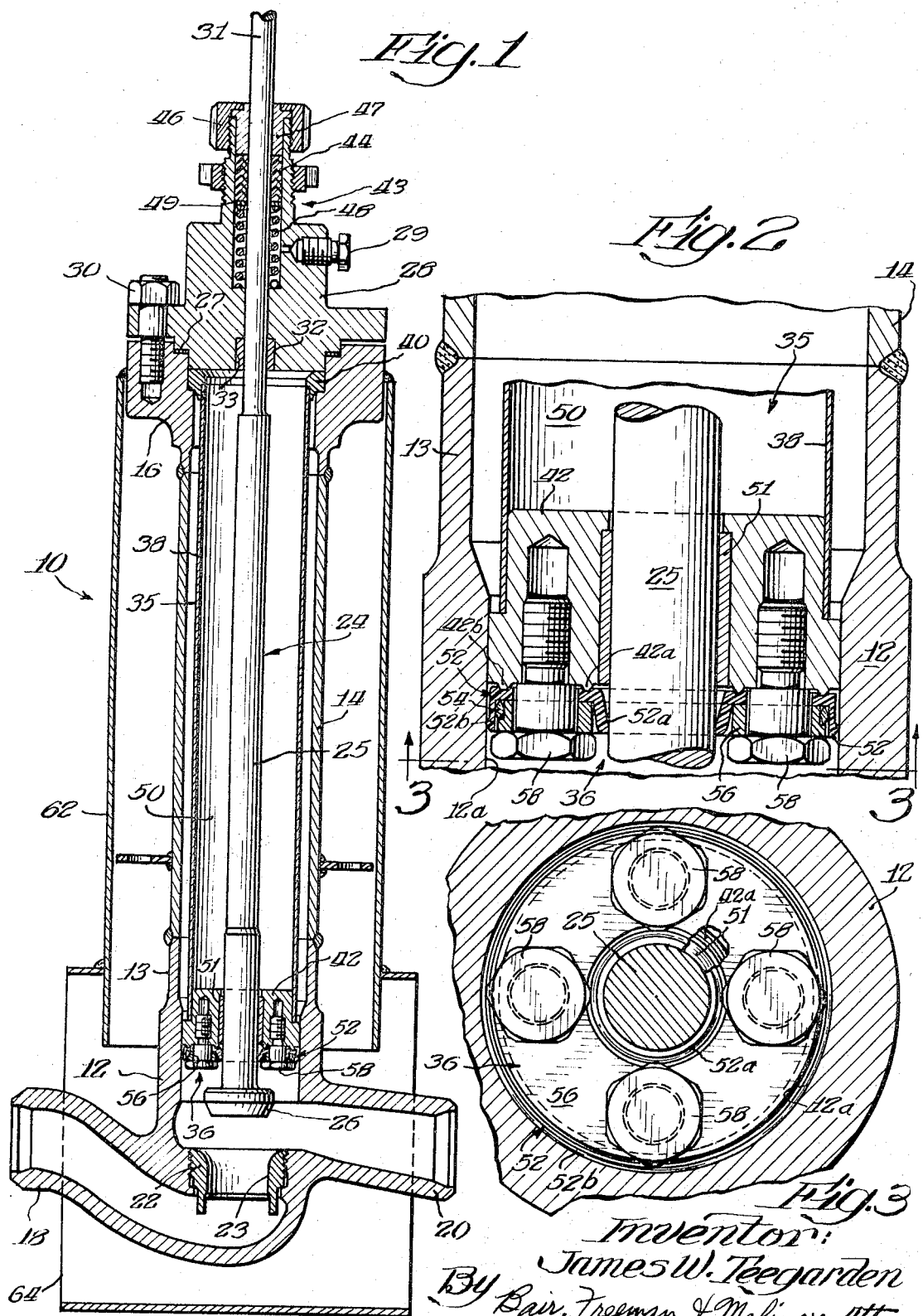
Inventor:
James W. Teegarden
By Bair, Freeman & Molinare Attys.

United States Patent Office 3,339,577
Patented Sept. 5, 1967

3,339,577
VALVE CONSTRUCTION
James W. Teegarden, McKinney, Tex., assignor to Fisher Governor Company, a corporation of Iowa
Filed Oct. 1, 1965, Ser. No. 492,245
7 Claims. (Cl. 137—375)

This invention relates to a valve for cryogenic service and, more particularly, to an improved valve having novel seal means for preventing leakage at cryogenic temperatures from the valve body into the chamber defined between the extension tubing and the valve stem at cryogenic temperatures.

One type of valve used for cryogenic service has extension tubing provided between the valve body and the bonnet (1) to reduce heat influx by providing a large thermal resistance and (2) to insure that the valve stem at the packing will be at a sufficiently high temperature to prevent formation of ice which might damage the packing. It is desired in such valves that there be no flow of cryogenic fluid from the valve body about the valve stem into the chamber defined between the extension tubing and the valve stem. Likewise, there should be no flow of cryogenic fluid between the seal means and the valve body into such chamber. Further, it is desired that the cage and bushing assembly within the valve including the novel seal means or baffle means be withdrawn as a unit from the valve at normal temperatures.

An object of the present invention is to provide an improved valve for cryogenic service having baffle means operatively responsive to different thermal expansion and contraction properties for restricting the flow of cryogenic fluid between the valve body and chamber within the extension tubing.

Another object of this invention is to provide an improved valve for cryogenic service having baffle means operative at cryogenic temperatures to seal cryogenic fluid both between the guide bushing holder and the valve body and between the guide bushing holder and the valve stem.

Yet another object of the present invention is to provide an improved valve having baffle means therein which include elements of different thermal expansion and contraction characteristics from the valve stem and valve body, such baffle means being constructed and arranged so as to restrict flow of cryogenic fluid between the valve body and the chamber within the extension tubing.

A further object is to provide a cryogenic valve with a cage and bushing assembly that may be removed as a unit from the valve, the cage and bushing assembly including novel baffle means for preventing undesired flow of cryogenic fluid between the bushing holder and valve body and between the valve stem and bushing holder.

Other objects and advantages of the present invention will be made more apparent from the following description.

The novel cryogenic valve and the mode of functioning of the valve and its components will be made most manifest and particularly pointed out in clear, concise and exact terms in conjunction with the accompanying drawings, wherein:

FIGURE 1 is a cross-sectional view of a valve adapted for cryogenic service embodying the principles of the present invention;

FIGURE 2 is an enlarged detail cross-sectional view of the valve, illustrating more clearly the cooperation between the baffle means, the valve stem, and the valve body, and FIGURE 3 is a cross-sectional view of the valve taken generally along the line 3—3 of FIGURE 2.

Referring now to FIGURE 1, there is illustrated a valve which embodies the principles of the present invention and which is adapted for cryogenic service. The valve 10 will be used for low temperature operation, on the order of minus 180 degrees to absolute 0 degrees. The valve 10 comprises a valve body 12 defining an upright tubular extension 13 which has extension tubing 14 secured to the upper end of the extension tubing 14 is a tubular extension flange 16. The joinder between the extension 13 on the valve body and the extension tubing 14 may be by welding. Likewise, the connection between the extension tubing 14 and the extension flange 16 may be by welding.

The valve body 12 comprises an inlet 18 and an outlet 20 adapted to be connected to suitable conduits for conducting the cryogenic fluid to and from the valve body 12. Formed within the valve body 12 is an opening adapted to receive therein a seat ring 22 which defines a flow passage 23 therethrough.

Reciprocatingly disposed within the valve 10 is a valve plug and stem assembly 24. The valve plug and stem assembly comprise a valve stem 25 operatively connected to a valve plug 26, which valve plug is adapted to be moved into engagement with the seat ring 22 for blocking fluid flow through the valve body 12 and is adapted to be moved away from the seat ring 22 to permit flow through the valve body 12. The seating surface on valve plug 26 cooperates with the seating surface on seat ring 22 in a conventional manner.

At its upper end, the valve stem 25 is guided for reciprocating movement within the bonnet 28 which is suitably affixed to the extension flange 16, as for example, by means of suitable stud and bolt means 30. Gasket 27 is provided between flange 16 and bonnet 28. The upper reduced portion 31 of the valve stem 25 slides within stem guide bushing 32 received in a recess 33 in the bonnet 28. Pipe plug 29 closes an access opening in the bonnet 28.

Adjacent its lower end, the valve plug and stem assembly 24 is guided within the baffle means 36 of the cage and bushing assembly 35. The cage and bushing assembly comprises an elongated tubular cage 38 that is sealed at its upper end to a cage retainer 40. The cage and cage retainer are made from a suitable metal, such as stainless steel, and are bonded, as by welding. At its lower end, the cage 38 is joined to the guide bushing holder 42 of the baffle means 36, as for example, by soldering the members together. Thus, it is seen that the cage 38 is in spaced relationship with respect to the extension tubing 14 and the valve stem 25 so as to provide a barrier for heat transfer. Further, the packing means 43 for the valve stem disposed within the bonnet 28 are sufficiently distant from the cryogenic fluid passing through valve body 12 to prevent formation of ice which might be harmful to the packing.

The packing means 43 for the upper end 31 of valve stem 25 comprises packing ring members 44 made from a suitable material, such as "Teflon" (polytetrafluoroethylene) or like plastic material or a composition material, disposed about the upper end of the valve stem portion 31 within bonnet 28. The ring members 44 are compressed between the packing follower 47 bearing upon the topmost ring members 44 and the washer 49 bearing upon the bottom ring member 44. Packing nut 46 urges the follower downwardly as viewed in FIGURE 1 against the bias of spring member 48, which acts upon the washer member 49 to urge the washer member upwardly to maintain compression upon the ring members 44.

Turning now to a consideration of the baffle means of the present invention, it is noted generally that the baffle means 36 is provided to restrict the flow of cryogenic fluid between the valve body 12 and the extension cavity or chamber 50 defined between the cage 38 and the valve stem 25. The baffle means 36 are particularly useful to restrict undesired leakage of cryogenic fluid during rapid stroking of the valve plug and stem assembly 24. In addition, the baffle means are operative to prevent the flow of cryogenic fluid into the cavity 50 in the event that the valve 10 is not installed with the bonnet end of the extension 14 at a higher elevation than the body end of the extension 14.

The baffle means 36 comprises the guide bushing holder 42, which is secured to the lower end of cage 38 and which supports guide bushing 51 in a recess therein, elastomeric cup ring 52, and energizing ring or baffle ring 54 of low thermal expansive material and an internal support ring or cap 56. The guide bushing 51 may be fabricated from steel backed with lead and Teflon impregnated. Four clamping bolts 58 are provided for securing the internal support ring 56, the energizing ring 54 and the cup ring 52 in place on the guide bushing holder 42. The clamping bolts 58 extend through spaced openings in the support ring 56. It will best be seen from FIGURE 2 that the lower surface of the guide bushing holder 42 is provided with a pair of annular concentric ridges 42a and 42b protruding therefrom. When the clamping bolts 58 are tightened, the spaced annular ridges 42a and 42b engage with the cup ring 52 to firmly retain the cup ring in place between the support ring 56 and the guide bushing holder 42. The ridges 42a and 42b form a seal to prevent leakage from around the bolts 58 passing by ring 52 into the chamber between the extension tubing and the valve stem. Another reason for the ridges is to allow dimensional latitude on the shoulders of retaining or clamping bolts 58 and the thickness of the cup ring. It is important that bolts 58 be shouldered in order to prevent loosening due to temperature cycling as a result of differential expansion between the metal bolts 58 and the plastic cup ring 52.

The cup ring 52 comprises an annular member that is in the shape of an inverted U in transverse cross section.

At ambient temperature (ordinarily 50–100° F.), there can be slight clearance or light contact between the inner lip 52a of the cup ring or hat seal 52 and the valve stem 25. Similarly, there may be slight clearance or light contact between the outer lip 52b of the cup ring 52 and the surface 12a of the valve body 12 which defines a portion of the flow bore within the valve body.

At cryogenic temperatures, the inside lip 52a of the cup ring 52, which may be fabricated from "Teflon" or like plastic material, contracts inwardly to a much greater degree than the valve stem 25, which is made from metal, thereby effecting a tight seal between the two members. The valve body 12 contracts inwardly to a much greater degree than the low thermal expansive ring 54 which is disposed between cup ring 52 and the stepped shoulder on support ring 56. As a consequence, the side of the outer lip 52b of the cup ring 52 is forced tightly against surface 12a. The baffle construction of this invention is operative at very low temperatures (on the order of −180° C. to absolute 0) to confine cryogenic fluid to the valve body and to restrict the flow of cryogenic fluid from the valve body to the chamber 50 defined in the extension tubing. The baffle means effectively seal between the guide bushing holder and the valve body and between the valve stem and the guide bushing holder at the low temperatures of normal valve operation.

The outer diameter of energizing ring 54 is somewhat greater than the outer diameter of internal support ring 56, thereby providing a slight recess between the depending protrusion or extension of cup ring 52 and the exterior of the support ring 56. The protrusion of the outer lip of the cup ring 52 extends below the edge of the energizing ring 54 (as seen in FIG. 2) and permits slight clearance or light contact between the outer annular flange or lip 52b of the cup ring 52 and the interior surface 12a of the valve body, eliminating the need to hold rigid tolerances on the diameter of the body bore, the thickness of the outer lip 52b of the cup ring 52, and the outside diameter of the energizing ring 54.

It is noted that the energizing ring 54 is shielded from the cryogenic fluid, e.g., liquid oxygen, by the support ring 56 and the outer lip 52b of the cup ring. Low thermal expansive materials, such as Invar 36 are basically ferrous materials and may burn in the presence of oxygen. Thus, when the valve is used in a liquid oxygen system, the energizing ring 54 should be shrouded by a non-ferrous material because the impingement of liquid oxygen at high velocity upon the energizing ring could possibly generate sufficient localized heating to initiate a fire. The energizing ring is protected by cooperation between the non-ferrous support ring 56 and the outer flange or lip of cup ring 52.

As shown in FIGURE 3, four clamping bolts 58 may be utilized to secure the internal support ring 56, energizing ring 54, and plastic cup ring 52 in place on the guide bushing holder. The number of clamping bolts is dependent upon the size of the valve and other known design considerations.

If desired, the valve 10 may be provided with vacuum jacketing comprising a tubular member 62 disposed in spaced relationship to extension tubing 14 and tubular wall members 64 disposed in spaced relationship about the valve body 12. The members 62 and 64 are suitably connected to one another and to the valve for insulating the surfaces of valve 10. As will be apparent to those versed in the art, the vacuum packeting may be omitted from the valve 10, depending upon the application for which the valve is utilized.

There has been provided by the present invention a valve specifically adapted for low temperature use, such valve having baffle means operative to restrict the flow of cryogenic fluid between the valve body and the extension cavity. The baffle means comprises components having different thermal expansive characteristics which cooperate with one another within the valve body in a unique manner to provide a highly effective seal. The cup ring 52 in a presently preferred form of the invention is made from "Teflon," the energizing ring 54 is made from a material, known commercially as Invar 36 and the internal support ring 56 is made from a material such as brass.

The cage and bushing assembly, including the baffle means may be readily withdrawn as a unit for repair or replacement at normal temperatures upon removal of bonnet 28 from extension flange 16.

While there has been shown and described a particular embodiment of this invention, it will be obvious to those skilled in the art that various changes and modifications may be made therein without departing from the invention. Therefore, it is intended in the appended claims to cover all such changes and modifications as fall within the true spirit and scope of the invention.

What I claim as new, and desire to secure by Letters Patent of the United States, is:

1. In a valve adapted for use at cryogenic temperatures comprising a valve body having a flow passage therethrough, extension tubing affixed at one end to said valve body, and a bonnet affixed to the end of the extension tubing remote from the valve body, and valve means including a valve stem reciprocable within said valve, the improvement comprising baffle means for sealing between the valve stem and the valve body comprising guide bushing means having a bore therethrough for slidably receiving a valve stem, said guide bushing means being adapted to be received in a bore in the valve body at normal temperatures, an annular plastic cup ring U-shaped in cross section disposed adjacent said guide bushing means, the base of the cup ring abutting the guide bushing means and the legs extending outwardly therefrom, one leg of the cup ring being adapted to cooperate with said valve stem and the other leg of the cup ring being adapted to cooperate wih said bore in the valve body, an internal support ring for holding said cup ring in place on the guide bushing means, an energizing ring disposed between the cup ring and the internal support ring, and means for retaining said internal support ring, said cup ring, and said energizing ring on said guide bushing means, said energizing ring being fabricated from a material having low thermal expansive properties, the materials of the valve body and the cup ring having higher thermal expansive properties than those of the energizing ring and valve stem, respectively, whereby at cryogenic temperatures of operation, the wall defining the bore in the valve body will contract inwardly to a greater extent than the energizing ring so as to cause sealing engagement between said wall and said other leg of the cup ring and the leg of the cup ring will contract to a greater extent than the valve stem to sealingly engage said one leg with the valve stem.

2. A valve as in claim 1 wherein the internal support ring comprises an annular member having a central opening therethrough for receiving the valve stem and a plurality of spaced openings, the retaining means passing through the spaced openings for affixing the internal support ring to the guide bushing means.

3. A valve as in claim 1 wherein the internal support ring has a stepped shoulder on the outer periphery thereof and the energizing ring is carried on said stepped shoulder, the energizing ring having a greater outside diameter than the maximum outside diameter of the internal support ring.

4. A valve as in claim 1 wherein the guide bushing means is provided with a pair of concentric ridges on the surface thereof abutting the base of the cup ring for assuring retention of the cup ring with respect to the guide bushing means.

5. A valve as in claim 1 wherein the other leg of the cup ring extends outwardly from the guide bushing means beyond the energizing ring, the circumferential lip on the end of the other leg thereby having freedom to accommodate for dimensional variations in the diameter of the body bore, the thickness of the outer leg and the outside diameter of the energizing ring.

6. In a valve adapted for use at cryogenic temperatures, the combination of a valve body, said valve body including an inlet and an outlet and an opening communicating with the passage through the valve body, extension tubing affixed at one end to the valve body and communicating with said opening, bonnet means affixed to the other end of the extension tubing remote from the valve body, a cage and baffle assembly removably disposed in said valve body and extension tubing, a valve stem and plug assembly reciprocably movable in said valve for controlling the flow through the passage in the valve body, said cage and baffle assembly including a baffle means for sealing between the valve stem and the valve body, said baffle means comprising a guide bushing means having a bore therethrough for slidably receiving the valve stem, the cage and baffle assembly being adapted to be received in the opening in the valve body at normal temperatures, an annular plastic cup ring U-shaped in cross setcion disposed adjacent said guide bushing means, the base of the cup ring abutting the guide bushing means and the legs of the cup ring extending outwardly therefrom, one leg of the cup ring being adapted to cooperate with said valve stem and the other leg of the cup ring being adapted to cooperate with said opening in the valve body, an internal support ring for holding said cup ring in place on the giude bushing means, an energizing ring made from a material having low thermal expansive properties disposed between the cup ring and the internal support ring, and means for retaining said internal support ring, said cup ring, and said energizing ring on the guide bushing means, the materials of the valve body and cup ring having higher thermal expansive properties than those of the energizing ring and valve stem, respectively, whereby at cryogenic temperatures of operation, the wall defining the opening in the valve body will contract inwardly to a greater extent than the energizing ring so as to cause sealing engagement between said wall and said other leg of the cup ring and the one leg of the cup ring will contract inwardly to a greater extent than the contraction of the valve stem to sealingly engage the one leg with the valve stem.

7. A valve as in claim 6 wherein said cup ring is made from polytetrafluoroethylene.

No references cited.

M. CARY NELSON, *Primary Examiner.*

H. KLINKSIEK, *Assistant Examiner.*